United States Patent
Kirsch et al.

(10) Patent No.: US 10,711,138 B2
(45) Date of Patent: Jul. 14, 2020

(54) INTERMEDIATES AND PROCEDURES FOR THE SYNTHESIS OF FUNCTIONAL MATERIALS

(71) Applicant: Merck Patent GmbH, Darmstadt (DE)

(72) Inventors: Peer Kirsch, Seeheim-Jugenheim (DE); Susann Gunst, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/091,535

(22) PCT Filed: Apr. 5, 2017

(86) PCT No.: PCT/EP2017/058045
§ 371 (c)(1),
(2) Date: Oct. 5, 2018

(87) PCT Pub. No.: WO2017/174619
PCT Pub. Date: Oct. 12, 2017

(65) Prior Publication Data
US 2019/0127586 A1  May 2, 2019

(30) Foreign Application Priority Data

Apr. 8, 2016  (EP) .................................. 16164565

(51) Int. Cl.
*C09B 57/00* (2006.01)
*C09K 19/60* (2006.01)
*C09K 19/34* (2006.01)

(52) U.S. Cl.
CPC .......... *C09B 57/00* (2013.01); *C09K 19/3477* (2013.01); *C09K 19/3486* (2013.01); *C09K 19/3497* (2013.01); *C09K 19/60* (2013.01)

(58) Field of Classification Search
CPC ............... C09B 57/00; C09K 19/3477; C09K 19/3486; C09K 19/3497; C09K 19/60
See application file for complete search history.

(56) References Cited

U.S. PATENT DOCUMENTS

| | | | |
|---|---|---|---|
| 2007/0073052 | A1 | 3/2007 | Velusamy |
| 2014/0274702 | A1 | 9/2014 | Eckelbarger |
| 2016/0108317 | A1 | 4/2016 | Kirsch |
| 2017/0267929 | A1 | 9/2017 | Kirsch |

FOREIGN PATENT DOCUMENTS

| | | |
|---|---|---|
| CN | 104610178 A | 5/2015 |
| CN | 104710386 A | 6/2015 |
| DE | 2031907 A1 | 1/1971 |
| WO | 2014187529 A1 | 11/2014 |
| WO | 2016029996 A1 | 3/2016 |
| WO | 2017035501 A1 | 3/2017 |

OTHER PUBLICATIONS

Naef, et al, Synthesis, structure and photochemical properties of 4,4',7,7'-tetra-substituted 1,1',3,3'-tetraethylbenzimidazolotriazatrimethine cyanines, Helvetica Chimica Acta, 61(8), 2958-73 (1978). (Year: 1978).*

Jiang, et al, Tetraphenylethene end-capped [1,2,5]thiadiazolo[3,4-c]pyridine with aggregation-induced emission and large two-photon absorption cross-sections†, RSC Adv., 5, 1500-1506 (2015). (Year: 2015).*

International Search Report PCT/EP2017/058045 dated Jun. 28, 2017 (pp. 1-5).

Jianyu Yuan et al: "Structure, band gap and energy level modulations for obtaining efficient materials in inverted polymer solar cells", Organic Electronics, vol. 14, No. 2, Feb. 1, 2013 (Feb. 1, 2013), pp. 635-643, XP055130314, ISSN: 1566-1199.

Silvia Zimdars et al: "Functionalization of the Benzo[c][1,2,5]thiadiazole Scaffold via Mg-, Zn- and Mn-Intermediates", Synthesis, vol. 2011, No. 08, Apr. 1, 2011 (Apr. 1, 2011), Stuttgart, DE., pp. 1302-1308, XP055382240, ISSN: 0039-7881.

Blouin N et al: "Toward a rational design of Poly(2,7-carbazole) Derivatives for Solar Cells", Journal of the American Chemical Society, American Chemical Society, US, vol. 130, No. 2, Jan. 1, 2008 (Jan. 1, 2008), pp. 732-742, XP002529842, ISSN: 0002-7863.

* cited by examiner

*Primary Examiner* — Erich A Leeser
(74) *Attorney, Agent, or Firm* — Millen White Zelano and Branigan, PC

(57) ABSTRACT

The present invention relates to heteroaromatic compounds which have two different reactive groups, their use in the synthesis of asymmetrically substituted compounds, and synthesis processes in which the compounds according to the invention are reacted sequentially with two different compounds, whereby an asymmetrically substituted compound is formed.

14 Claims, No Drawings

INTERMEDIATES AND PROCEDURES FOR THE SYNTHESIS OF FUNCTIONAL MATERIALS

The present application is concerned with intermediate compounds for use in the synthesis of functional materials, in particular dye compounds, again in particular dye compounds for use in guest-host liquid crystal materials.

Dyes as components of guest host liquid crystal materials have been applied in liquid crystal windows (as disclosed in WO 2014/090373, WO 2014/187529, and WO 2015/090497, for example) and, already since long time, in liquid crystal displays.

The basic working principle of the above-mentioned guest host liquid crystal windows is as follows: The dye present in the liquid crystal material is dichroic and orients in the same direction as the molecules of the liquid crystal material. The molecules of the liquid crystal material themselves, in turn, can be oriented in a particular common direction by an electrical field. If now, a layer is formed of the liquid crystal material comprising the dye, the orientation of the dye molecules can be controlled by the application of an electrical field over the layer. Since the dye is dichroic, such change in its orientation results in a change of its absorption coefficient. Thereby, the transmissivity to light of the layer of the liquid crystal material comprising the dye can be changed by application of an electrical voltage.

For the purposes of the present application, a dichroic dye is taken to mean a light-absorbing compound in which the absorption properties are dependent on the orientation of the compound relative to the polarisation direction of the light. A dichroic dye compound typically has an elongated shape, meaning that the compound is significantly longer in one spatial direction (longitudinal direction) than in the other two spatial directions.

Desired properties for the dye compounds for use the above-mentioned applications are, in particular, dichroism and the property to orient in a common direction with a liquid crystal material. Further properties which are of high interest are fluorescence, high chemical stability, in particular light-fastness, and suitable wavelength of absorption.

Of the currently known compounds for use in guest host liquid crystal windows, dye compounds having a central benzothiadiazole moiety and two aromatic side chains which extend to the left and to the right of the benzothiadiazole moiety, as disclosed for example in WO 2014/187529, are of particular interest due to their favorable properties.

In this context of the present application, in its broadest scope, the respective benzothiadiazole derivatives in which the S atom is replaced by an O or Se are also understood to be embraced by the general term "benzothiadiazole".

Among such dye compounds for use in guest host liquid crystal materials, those which are unsymmetrically substituted, in the sense that they have two different side chains, are of particular interest due to their improved solubility and due to the fact that they allow exact color tuning.

The problem of the synthesis of such benzothiadiazole compounds has not sufficiently been solved yet. In particular, if benzothiadiazole compounds which have two different side-chains are to be synthesized, the method of the state of the art, which is disclosed in above-mentioned WO 2014/187529, uses a dibromo-derivative of the central benzothiadiazole core, which is reacted with one equivalent of the first side chain, in order to arrive at an intermediate which bears only one side chain and still has one bromo group unreacted. In a second step, this intermediate is reacted with the second side chain, to give the end product having two different side chains (see scheme 1 shown below).

Scheme 1

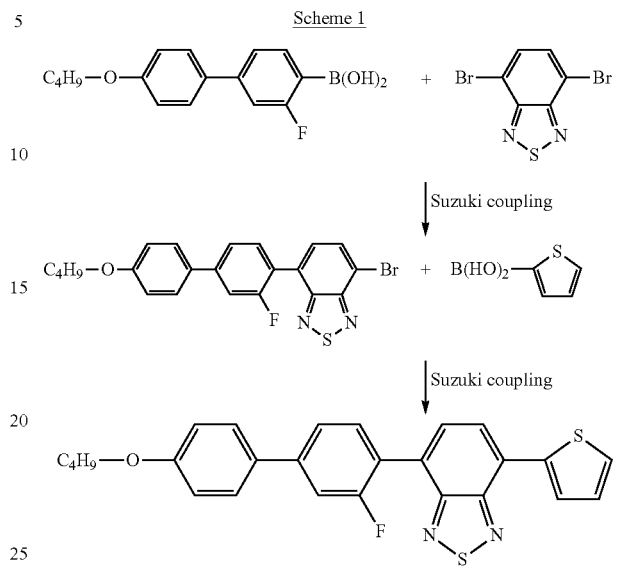

Such method of synthesis however results in large amounts of unreacted and bis-reacted side product in the first reaction step, which are complicated to separate off. Therefore, such method is highly unsatisfactory.

To solve this problem, the inventors of the present application have found a new benzothiadiazole intermediate compound which can be selectively reacted in a first step with the first side chain, and then in a second step with the second side chain, without giving the large amounts of side products which are characteristic of the state of the art method.

Such compond, which is one object of the present invention, conforms to the following formula (I)

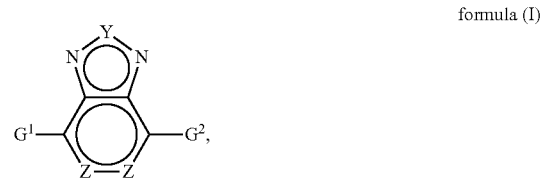

formula (I)

where the following applies to the variable groups occurring:

$G^1$, $G^2$ are selected from reactive groups, and $G^1$ and $G^2$ are selected differently;

Y is selected from O, S and Se;

Z either is selected, identically or differently, from $CR^1$ and N; or the unit Z—Z is replaced by a divalent group selected from —S— and —Se—;

$R^1$ is selected, identically or differently on each occurrence, from H, D, F, Cl, CN, $NO_2$, $N(R^2)_2$, —(C=O) $OR^2$, —O(C=O)$R^2$, and alkyl, alkoxy or thioalkoxy groups having 1 to 20 C atoms, where the alkyl, alkoxy and thioalkoxy groups may be substituted with one or more radicals $R^2$, and where one or more $CH_2$ groups in the alkyl, alkoxy and thioalkoxy groups may be replaced by —$R^2C=CR^2$—, —C≡C—, C=O, C=S, —C(=O)O—, —OC(=O)—, —Si($R^2$)$_2$—, —$NR^2$—, —O— or —S—;

$R^2$ is selected, identically or differently on each occurrence, from H, D, F, Cl, CN, $NO_2$, $NH_2$, $NAr_2$, and alkyl, alkoxy or thioalkoxy groups having 1 to 20 C atoms, where one or more $CH_2$ groups in the alkyl, alkoxy and thioalkoxy groups may be replaced by —HC=CH—, —C≡C—, C=O, C=S, —C(=O)O—, —OC(=O)—, —NH—, —O— or —S—, and where the alkyl, alkoxy and thioalkoxy groups may be substituted with one or more radicals selected from F, Cl and CN;

Ar is selected, identically or differently, from aryl and heteroaryl groups having 5 to 30 aromatic ring atoms, which may be substituted by one or more radicals $R^2$, which do not comprise a group Ar.

Compounds according to formula (I) have the following advantages over those known in the prior art:

1) Their preparation is easy and straightforward, starting from commercially available compounds 2) They can be reacted to asymmetrically substituted compounds with small amounts of side-products and high yield 3) The dye compounds which can be obtained using the compounds of formula (I) have excellent light-fastness, fluorescence intensity, solubility and absorption characteristics 4) Depending on the substituents and variable groups used in the compounds of formula (I), dyes with different absorption wavelengths can be obtained.

It is noted in this context that the circles which are drawn in the benzothiadiazole five-ring and in the six-ring below indicate that these two rings have aromaticity.

An aryl group in the sense of this invention contains 6 to 30 aromatic ring atoms; a heteroaryl group in the sense of this invention contains 5 to 30 aromatic ring atoms, at least one of which is a heteroatom. The hetero-atoms are preferably selected from N, O and S. This represents the basic definition. If other preferences are indicated in the description of the present invention, for example with respect to the number of aromatic ring atoms or the heteroatoms present, these apply.

An aryl group or heteroaryl group here is taken to mean either a simple aromatic ring, i.e. benzene, or a simple heteroaromatic ring, for example pyridine, pyrimidine or thiophene, or a condensed (annellated) aromatic or heteroaromatic polycycle, for example naphthalene, phenanthrene, quinoline or carbazole. A condensed (annellated) aromatic or heteroaromatic polycycle in the sense of the present application consists of two or more simple aromatic or heteroaromatic rings condensed with one another. A polycycle of this type may also contain individual non-conjugated units, as in the case, for example, of the fluorene basic structure.

An aryl or heteroaryl group, which may in each case be substituted by the above-mentioned radicals and which may be linked to the aromatic or heteroaromatic ring system via any desired positions, is taken to mean, in particular, groups derived from benzene, naphthalene, anthracene, phenanthrene, pyrene, dihydropyrene, chrysene, perylene, fluoranthene, benzanthracene, benzophenanthrene, tetracene, pentacene, benzopyrene, fluorene, spirobifluorene, furan, benzofuran, isobenzofuran, dibenzofuran, thiophene, benzothiophene, isobenzothiophene, dibenzothiophene, benzodithiophene, cyclopentadithiophene, thienothiophene, indenothiophene, dithienopyrrole, silolodithiophene, selenophene, benzoselenophene, dibenzoselenophene, pyrrole, indole, isoindole, carbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyridimidazole, pyrazinimidazole, quinoxalinimidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzopyrimidine, quinoxaline, pyrazine, phenazine, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine and benzothiadiazole.

For the purposes of the present invention, an alkyl group having 1 to 20 C atoms or an alkenyl or alkynyl group having 2 to 20 C atoms, in which, in addition, individual H atoms or $CH_2$ groups may be substituted by the groups mentioned above under the definition of the radicals, is preferably taken to mean the radicals methyl, ethyl, n-propyl, i-propyl, n-butyl, i-butyl, s-butyl, t-butyl, 2-methylbutyl, n-pentyl, s-pentyl, cyclopentyl, neopentyl, n-hexyl, cyclohexyl, neohexyl, n-heptyl, cycloheptyl, n-octyl, cyclooctyl, 2-ethylhexyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl or octynyl.

An alkoxy or thioalkoxy group having 1 to 20 C atoms is preferably taken to mean methoxy, trifluoromethoxy, ethoxy, n-propoxy, i-propoxy, n-butoxy, i-butoxy, s-butoxy, t-butoxy, n-pentoxy, s-pentoxy, 2-methylbutoxy, n-hexoxy, cyclohexyloxy, n-heptoxy, cycloheptyloxy, n-octyloxy, cyclooctyl-oxy, 2-ethylhexyloxy, pentafluoroethoxy, 2,2,2-trifluoroethoxy, methylthio, ethylthio, n-propylthio, i-propylthio, n-butylthio, i-butylthio, s-butylthio, t-butylthio, n-pentylthio, s-pentylthio, n-hexylthio, cyclohexylthio, n-heptylthio, cycloheptylthio, n-octylthio, cyclooctylthio, 2-ethylhexylthio, trifluoromethylthio, pentafluoroethylthio, 2,2,2-trifluoroethylthio, ethenylthio, propenylthio, butenylthio, pentenylthio, cyclopentenylthio, hexenylthio, cyclohexenylthio, heptenylthio, cycloheptenylthio, octenylthio, cyclooctenylthio, ethynylthio, propynylthio, butynylthio, pentynylthio, hexynylthio, heptynylthio or octynylthio.

Preferably, in the compound of formula (I), $G^1$ and $G^2$ are selected from reactive groups which are capable of acting as leaving groups. A leaving group in the sense of the present invention is understood to be a group, which, under the action of a nucleophile or an electrophile which reacts with the compound comprising the leaving group, is split off from the compound. More preferably, $G^1$ and $G^2$ are selected from nucleofuges. A nucleofuge in the sense of the present invention is understood to be a group, which, under the action of a nucleophile which reacts with the compound comprising the nucleofuge, is split off from the compound. Most preferably, $G^1$ and $G^2$ are selected from strong leaving groups, in particular strong nucleofuges, even more preferably from leaving groups, in particular nucleofuges, which are stronger than aryloxy, preferably stronger than fluoride, more preferably stronger than amine.

Preferably, one of $G^1$ and $G^2$ is a stronger leaving group, in particular a stronger nucleofuge, than the other one of $G^1$ and $G^2$.

Further preferably, one of $G^1$ and $G^2$ is a group which is more prone to oxidative addition to Pd(0) complexes, than the other one of $G^1$ and $G^2$.

It is preferred that $G^1$ and $G^2$ are selected from halogen atoms, fluorosulfonate groups, alkylsulfonate groups in which the alkyl group is optionally substituted by one or more F groups, and carbonic acid ester groups. Among these groups, Cl, Br, I, and alkylsulfonate groups in which the alkyl group is substituted by one or more F groups are particularly preferred. Even more preferred are Cl, Br and I, most preferred are Cl and Br.

The following table shows preferred combinations of groups $G^1$ and $G^2$.

| Variation of Formula (I) | $G^1$ | $G^2$ |
| --- | --- | --- |
| Formula (I-a) | —OS(O)$_2$R$^x$ | Br |
| Formula (I-b) | —OS(O)$_2$R$^x$ | I |
| Formula (I-c) | Cl | Br |
| Formula (I-d) | Cl | I |
| Formula (I-e) | Br | I |
| Formula (I-f) | Br | Cl |
| Formula (I-g) | Br | —OS(O)$_2$R$^x$ |
| Formula (I-h) | I | Cl |
| Formula (I-i) | I | Br |
| Formula (I-j) | I | —OS(O)$_2$R$^x$ | where $R^x$ is selected from F and alkylsulfonate groups in which the alkyl group is optionally substituted by one or more F groups.

For the compound according to formula (I), it is preferred that one of the following applies: a) $G^1$ is Cl, and $G^2$ is selected from Br and I; or b) $G^1$ is Br, and $G^2$ is selected from I, Cl and alkylsulfonate groups in which the alkyl group is substituted by one or more F groups; or c) $G^1$ is I; and $G^2$ is selected from Cl, Br and alkylsulfonate groups in which the alkyl group is substituted by one or more F groups; or d) $G^1$ is selected from alkylsulfonate groups in which the alkyl group is substituted by one or more F groups; and $G^2$ is selected from I and Br.

For the compound according to formula (I), it is more preferred that one of $G^1$ and $G^2$ is Br, and the other one of $G^1$ and $G^2$ is Cl.

For the compound of formula (I), it is preferred that Y is S. Further, it is preferred that Z is $CR^1$.

Further, regarding the compound of formula (I), it is preferred that one of the following applies: a) both groups Z are $CR^1$, where the groups $R^1$ are defined as above and are selected identically; or b) both groups Z are N; or c) the unit Z—Z is replaced by the divalent group —S—.

In the compound of formula (I), it is preferred that its unit of formula (I-core)

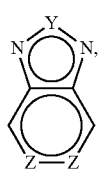

formula (I-core)

including any substituents of the groups Z, belongs to the point group $C_{2v}$.

This is understood to mean that the unit of formula (I-core) has a mirror plane which is perpendicular to the plane of the paper and which includes the group Y and cuts through the middle of the bond of the unit Z—Z.

Regarding the formula (I), it is preferred that it conforms to more specific formulae (I-1), (I-2) and (I-3)

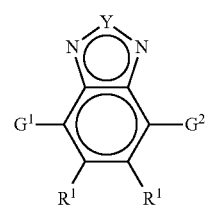

formula (I-1)

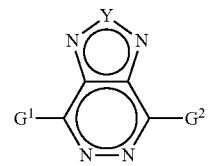

formula (I-2)

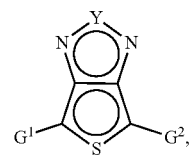

formula (I-3)

where the variable groups are defined as above, and preferably have their preferred meanings.

Among formulae (I-1) to (I-3), formula (I-1) is preferred.

In the case of formula (I-1), it is preferred that the groups $R^1$ are selected identically.

Generally, regarding $R^1$, it is preferred that it is selected, identically or differently on each occurrence, from H, F, CN, $NO_2$ and $NH_2$. Preferably, $R^1$ is selected identically from these groups. Particular preference is given to the embodiment in which $R^1$ is H.

Generally, regarding $R^2$, it is preferred that this group is selected, identically or differently on each occurrence, from alkyl and alkoxy groups having 1 to 20 C atoms, where the alkyl and alkoxy groups may be substituted by one or more radicals selected from F and Cl.

Specific examples of the compound of formula (I) are the following:

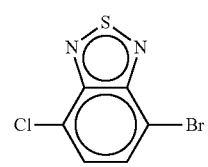

(1)

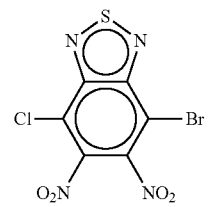

(2)

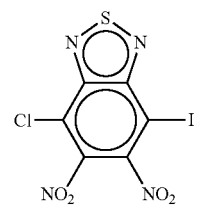

(3)

-continued (4)
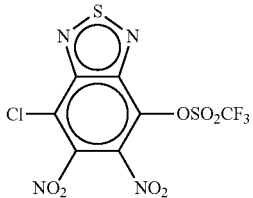

(5)
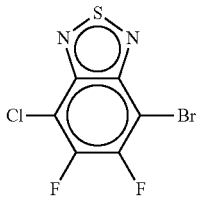

(6)
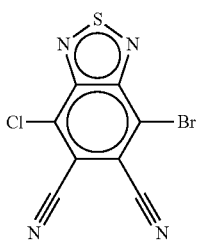

(7)
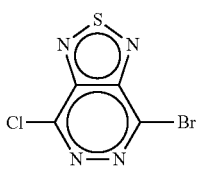

(8)
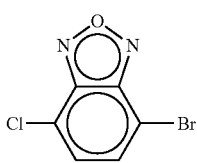

(9)
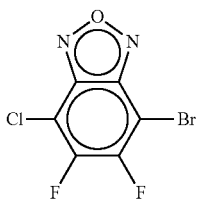

The compound of formula (I) is preferably prepared using a method in which a compound of the formula (I-Int)

formula (I-Int)

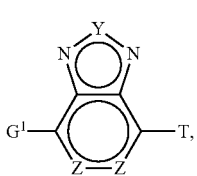

where T is selected from H, D, and —OH, and the other variable groups which occur are as defined above, is used as the starting material. For the variable groups which are described above, these are preferably present in their preferred embodiments. Particularly preferably, in formula (I-Int), $G^1$ is selected from Cl and Br, and/or Y is S.

Preferred methods of synthesis of the compound of formula (I) are depicted below:

According to one preferred method, a starting material is used in which T is hydrogen, and $G^1$ is as defined above, and preferably is Br or Cl, most preferably Cl, where $G^1$ and $G^2$ are in each case different (Scheme 2).

Scheme 2

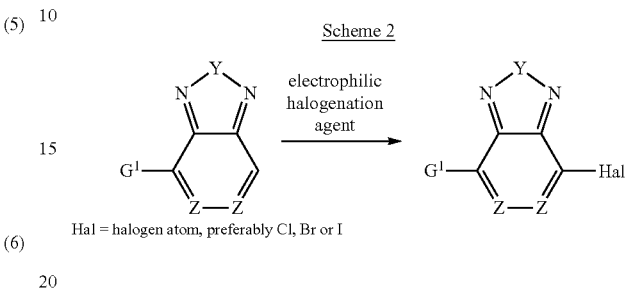

Hal = halogen atom, preferably Cl, Br or I

In this method, the starting material according to formula (I-Int), where T is hydrogen, is reacted with an electrophilic halogenation agent, preferably with an electrophilic halogenation agent of the N-halogen type, to introduce a halogen atom in the position of the group $G^2$ in formula (I).

A preferred embodiment of the method of Scheme 2 is illustrated in below Scheme 2A:

Scheme 2A a)

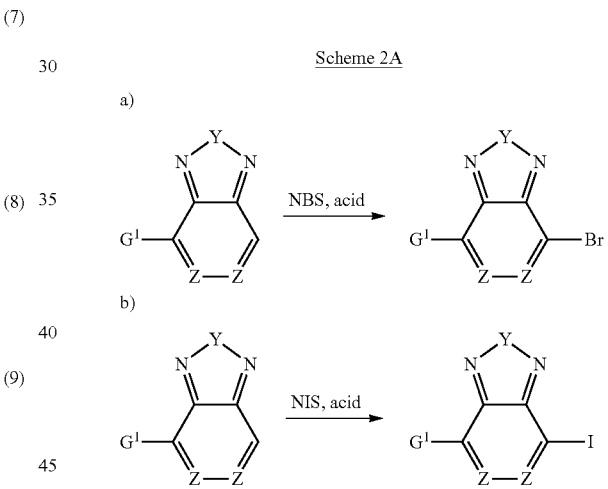

b)

In this method, the starting material according to formula (I-Int) is reacted with N-Bromosuccinimide (NBS) to introduce Br as a group $G^2$ (part a)), or the starting material is reacted with N-Iodosuccinimide (NIS) to introduce I as a group $G^2$ (part b)). A further possible reagent which may be used as an alternative to NBS in this reaction is 1,3-Dibromo-5,5-dimethylhydantoin (DBH).

According to another preferred method, a starting material is used in which T is —OH, and $G^1$ is as defined above, and preferably is I or Br (Scheme 3, $R^x$ is defined as above).

Scheme 3

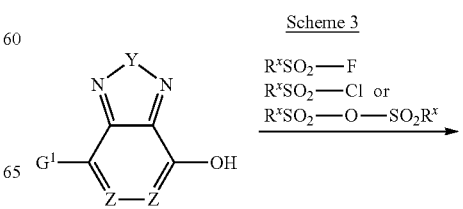

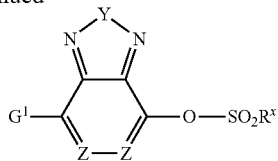

In this method, the starting material according to formula (I-Int) is transformed into a fluorosulfonate group or an alkylsulfonate group in which the alkyl group is optionally substituted by one or more F groups. This can be done by action of a fluorosulfonyl chloride or anhydride, or by action of an alkylsulfonyl chloride, fluoride or anhydride, where the alkyl group is optionally substituted by one or more F groups.

Object of the present invention is therefore, according to the above, a synthesis process for a compound of formula (I) in which either a) T is H or D, and the group T is replaced by a halogen, preferably Br or I, by action of an electrophilic halogenation agent, preferably an electrophilic halogenation agent of the N-halogen type, most preferable by action of N-Bromosuccinimide or N-Iodosuccinimide, or b) T is OH and the group T is transformed into a fluorosulfonate group or an alkylsulfonate group in which the alkyl group is optionally substituted by one or more F groups, by action of the respective fluorosulfonyl chloride or anhydride, or by action of the respective alkylsulfonyl chloride, fluoride or anhydride, respectively.

The compounds of formula (I) can be used as starting materials for the synthesis of a wide variety of compounds. Preferably, they are used for the synthesis of dye compounds, particularly preferably for the synthesis of dichroic dye compounds. Most preferably, they are used for the synthesis of dye compounds with asymmetric structure, in particular for dye compounds which have different side chains on the two sides of a central unit which has a structure according to formula (I-core) above.

The preferred reaction scheme for the synthesis of dye compounds or precursors according to formula (P) from compounds of formula (I) is shown in the following Scheme:

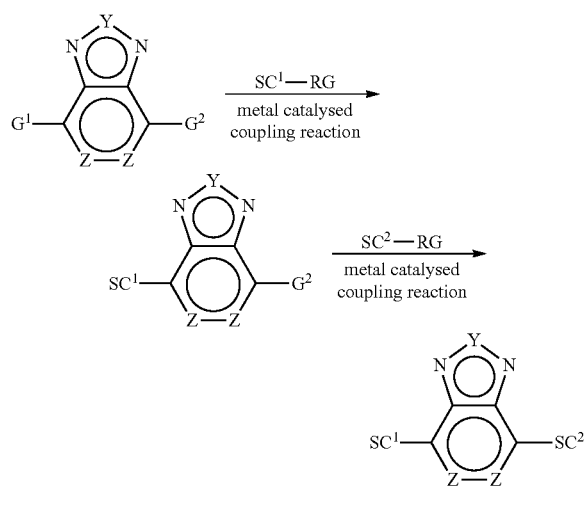

Scheme 4

In the above Scheme, variable groups Y, $G^1$, $G^2$ and Z are defined as above, $SC^1$ stands for a first aromatic side chain, $SC^2$ stands for a second aromatic side chain, and RG stands for a reactive group.

Characteristic of the scheme is that the first side chain is selectively coupled to the compound of formula (I) in a first reaction, and the second side chain is coupled in a second reaction.

Preferably, in this Scheme, $G^1$ is a more reactive group than $G^2$. More preferably, $G^1$ is Br, and $G^2$ is Cl.

Preferably, $SC^1$ and $SC^2$ differ in their chemical structure. Further, preferably, $SC^1$ and $SC^2$ are selected from aromatic chains which comprise 1 to 3 aryl or heteroaryl groups, which are linked to one another by single bonds or by organic connecting groups. Particularly preferably, $SC^1$ and $SC^2$ are selected from groups of the formula (SC)

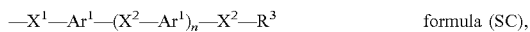

where the following applies to the variable groups and indices used:

$Ar^1$ is on each occurrence, identically or differently, an aryl or heteroaryl group having 5 to 30 aromatic ring atoms, which may be substituted by one or more radicals $R^4$;

$X^1$ is on each occurrence, identically or differently, a single bond, $-CR^5=CR^5-$ or $-C\equiv C-$; or two, three, four or five groups combined with one another, selected from the groups $-CR^5=CR^5-$ and $-C\equiv C-$;

$X^2$ is on each occurrence, identically or differently, a single bond, $-CR^5=CR^5-$ or $-C\equiv C-$; or two, three, four or five groups combined with one another, selected from the groups $-CR^5=CR^5-$ and $-C\equiv C-$;

$R^3$ is on each occurrence, identically or differently, H, D, F, CN, $N(R^6)_2$, or an alkyl, alkoxy or thioalkoxy group having 1 to 20 C atoms, or an alkenyl or alkinyl group having 2 to 20 C atoms, where the alkyl, alkoxy, thioalkoxy, alkenyl and alkinyl groups may be substituted by one or more radicals $R^6$, and where one or more $CH_2$ groups in the alkyl, alkoxy, thioalkoxy, alkenyl and alkinyl groups may be replaced by $-R^6C=CR^6-$, $-C\equiv C-$, $C=O$, $C=S$, $-C(=O)O-$, $-OC(=O)-$, $Si(R^6)_2$, $NR^6$, $-O-$ or $-S-$;

$R^4$, $R^5$ are on each occurrence, identically or differently, H, D, F, Cl, CN, or an alkyl, alkoxy or thioalkoxy group having 1 to 20 C atoms, or an alkenyl or alkinyl group having 2 to 20 C atoms, where the alkyl, alkoxy, thioalkoxy, alkenyl and alkinyl groups may be substituted by one or more radicals $R^6$, and where one or more $CH_2$ groups in the alkyl, alkoxy, thioalkoxy, alkenyl and alkinyl groups may be replaced by $-R^6C=CR^6-$, $-C\equiv C-$, $C=O$, $C=S$, $-C(=O)O-$, $-OC(=O)-$, $Si(R^6)_2$, $NR^6$, $-O-$ or $-S-$;

$R^6$ is on each occurrence, identically or differently, H, D, F, Cl, CN, $N(R^7)_2$, an alkyl, alkoxy or thioalkoxy group having 1 to 20 C atoms, an alkenyl or alkynyl group having 2 to 20 C atoms, or an aryl or heteroaryl group having 5 to 30 aromatic ring atoms, where the aryl and heteroaryl group may in each case be substituted by one or more radicals $R^7$, where the alkyl, alkoxy, thioalkoxy, alkenyl and alkynyl groups may each be substituted by one or more radicals $R^7$, and where one or more $CH_2$ groups in the alkyl, alkoxy, thioalkoxy, alkenyl and alkynyl groups may be replaced by $-R^7C=CR^7-$, $-C\equiv C-$, $C=O$, $C=S$, $-C(=O)O-$, $-O(C=O)-$, $Si(R^7)_2$, $NR^7$, $-O-$ or $-S-$;

R[7] is on each occurrence, identically or differently, H, F or an aliphatic organic radical having 1 to 20 C atoms, in which one or more H atoms may be replaced by F, or an aryl or heteroaryl group having 5 to 20 C atoms, in which one or more H atoms may be replaced by F; n is, identically or differently on each occurrence, selected from 0, 1, 2, 3, 4, or 5.

If n is greater than 1, the groups within the brackets may be identical or different.

If n is equal to 0, the group within the brackets is absent, and the groups $Ar^1$ and $X^2$ are connected directly to one another.

The formulation "two, three, four or five groups combined with one another, selected from the groups . . . " in the sense of the present application is taken to mean that the groups are bonded to one another, preferably in the form of a chain in which two, three, four or five of the groups are bonded to one another. Preference is given to a combination of precisely two or three groups. The groups can generally be identical or different.

An aliphatic organic radical having 1 to 20 C atoms is in principle taken to mean any desired organic radical which is not aromatic or heteroaromatic. It is preferably taken to mean alkyl groups having 1 to 10 C atoms, alkoxy groups having 1 to 10 C atoms or alkenyl or alkynyl groups having 2 to 10 C atoms, as described in greater detail above.

Further, preferably, RG is selected from groups comprising boron and from groups comprising tin. More preferably, RG is selected from $-B(OH)_2$, $-B(OR)_2$ and $-BF_3^-$, if it is a group comprising boron, or RG is selected from $-SnR_3$, if it is a group comprising tin. R in this case is selected, identically or differently, from organic radicals, including halogens.

Preferred reaction conditions are in the case of a group RG which is selected from boron comprising groups, reaction conditions of a Suzuki coupling reaction. In the case of a group RG which is selected from groups comprising tin, preferred reaction conditions are those of a Stille coupling reaction.

In the first and in the second reaction step, in each case preferably 0.8 to 1.8 equivalents of the compound $SC^1$-RG or $SC^2$-RG, respectively, are used, more preferably, 0.9 to 1.4 equivalents, most preferably, 1.0 to 1.2 equivalents.

As catalysts, $Pd^0$ complexes are preferred, particularly preferably $Pd(PPh_3)_4$, $Pd(PCyc_3)_4$, where Cyc is cyclohexyl, and $Pd^0$ complexes with phosphine ligands substituted with tBu and/or adamantyl.

Preferably, in the first reaction step, a less reactive catalyst and/or more mild reaction conditions are used, whereas in the second step, a more reactive catalyst and/or more harsh reaction conditions are used. A preferred catalyst for the first reaction step is $Pd(PPh_3)_4$, and a preferred catalyst for the second reaction step is $Pd(PCyc_3)_4$, where Cyc is cyclohexyl.

The compound which is obtained after the second coupling reaction is, according to one embodiment of the invention, the final product of the synthesis. According to another embodiment of the invention, it may be necessary to add one or more further reaction steps, in order to afterwards arrive at the final dye compound.

For example in the synthesis of quinoxalino thiadiazoles, as disclosed in yet unpublished DE 102015005800.2, the following reactions steps are preferably subsequently applied (Scheme 5):

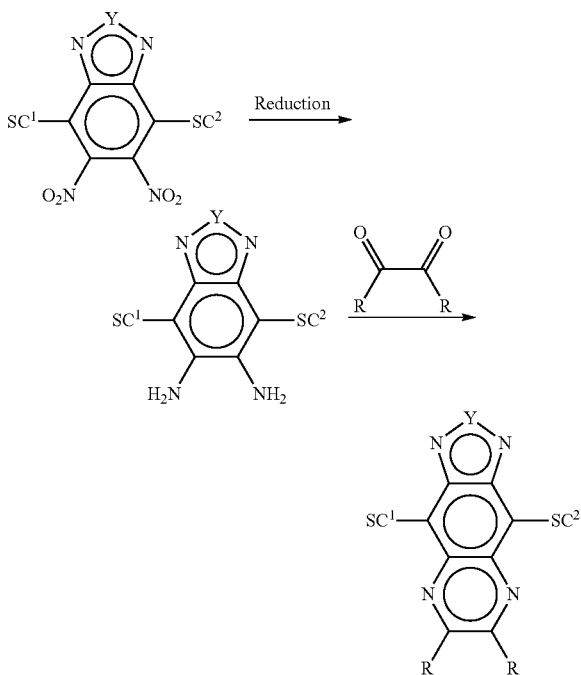

Scheme 5

R is here an organic radical, and $SC^1$ and $SC^2$ are defined as above.

The dinitro compound can be obtained from the unsubstituted starting material by nitration with $HNO_3$ and $CF_3SO_3H$. Further, in the first step of the shown reaction sequence, the nitro groups are reduced to amine groups by action of a reduction agent, preferably elemental iron with acetic acid or sponge nickel catalyst. In a second reaction step, the intermediate is reacted with a suitably substituted dicarbonyl compound to give the final product.

As another example, in the synthesis of malono dinitrile derivatives, as disclosed in yet unpublished EP 14004145.0, the following reaction step is preferably subsequently applied (Scheme 6):

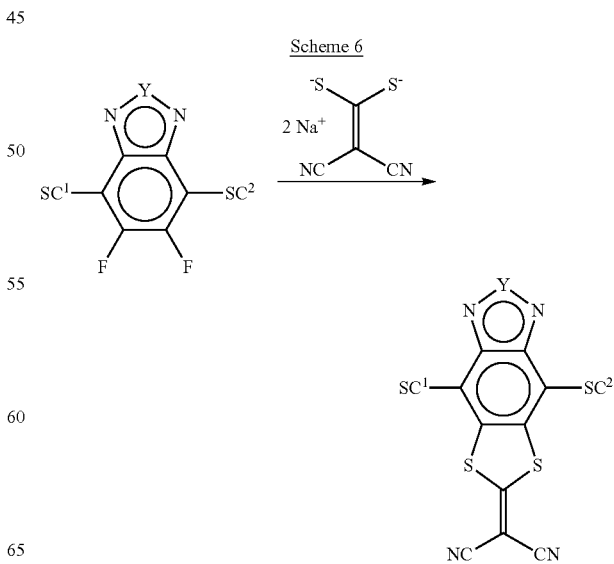

Scheme 6

In this reaction step, the fluorine groups are replaced by the sulfide ions of the malono dinitrile reactant in a nucleophilic substitution reaction, whereby a five-ring comprising the two sulfur atoms is formed.

Particular preference is given to the synthesis of compounds starting from compounds of formula (I), where the compounds have a structure according to the following formula (P)

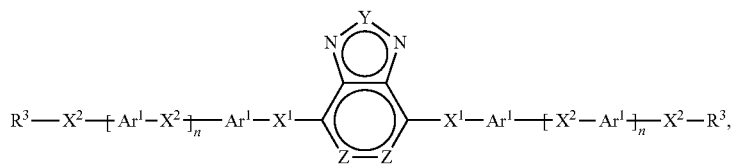

formula (P)

where the variable groups and indices which occur are defined as above.

In formula (P), Y is selected from O, S and Se; and Z is either selected, identically or differently, from $CR^1$ and N; or the unit Z—Z is replaced by a divalent group selected from —S— and —Se—, of which —S— is preferred.

For formula (P) and also for the side chains of formula (SC) in general, the following preferences apply:

Y preferably stands for S.

Z preferably stands, identically or differently, for a group $CR^1$.

$X^1$ preferably stands for a single bond.

$X^2$ preferably stands for a single bond.

$Ar^1$ preferably represents on each occurrence, identically or differently, an aryl group having 6 to 15 C atoms or a heteroaryl group having 5 to 15 C atoms, which may be substituted by one or more radicals $R^4$. $Ar^1$ is particularly preferably selected on each occurrence, identically or differently, from benzene, fluorene, naphthalene, pyridine, pyrimidine, pyrazine, triazine, thiophene, benzothiophene, dibenzothiophene, benzodithiophene, cyclopentadithiophene, thienothiophene, indenothiophene, dithienopyrrole, silolodithiophene, selenophene, benzoselenophene, dibenzoselenophene, furan, benzofuran, dibenzofuran and quinoline, each of which is optionally substituted by radicals $R^4$. Particular preference is given to benzene or thiophene, each of which may optionally be substituted by F.

The group $R^3$ is preferably on each occurrence, identically or differently, H, F, $N(R^6)_2$ or a straight-chain alkyl or alkoxy group having 3 to 10 C atoms, which may be substituted by one or more radicals $R^6$, or a branched alkyl or alkoxy group having 3 to 10 C atoms, which may be substituted by one or more radicals $R^6$, where one or more $CH_2$ groups in the alkyl and alkoxy groups may be replaced by —O—, —S— or —$R^6C$=$CR^6$—.

$R^4$, $R^5$ are preferably on each occurrence, identically or differently, H, F, or an alkyl group having 1 to 10 C atoms, which may be substituted by one or more radicals $R^6$. $R^4$, $R^5$ are particularly preferably on each occurrence, identically or differently, H or F.

$R^6$ is on each occurrence, identically or differently, H, F, CN, or an alkyl or alkoxy group having 1 to 10 C atoms, which may be substituted by one or more radicals $R^7$, or an aryl or heteroaryl group having 5 to 30 aromatic ring atoms, which may in each case be substituted by one or more radicals $R^7$.

The index n is preferably equal to 1, 2 or 3, particularly preferably equal to 1 or 2, very particularly preferably equal to 1.

The compounds of the formula (P) preferably have in total 3 to 5 aromatic ring structures. Aromatic ring structure thus denotes a single ring, or an annellated ring system, where the annellated ring system preferably has 2 to 4 annellated rings. The compound of the formula (P) preferably has 5 ring systems, namely a central group comprising the benzothiadiazole and 2 aromatic rings connected to one another on each side.

In the compounds according to formula (P), it is preferred that the two side chains —$X^1$—$Ar^1$—$(X^2$—$Ar^1)_n$—$X^2$—$R^3$ are different from each other.

Preferable among the compounds of formula (P) are compounds which conform to one of formulae (P-1) to (P-3)

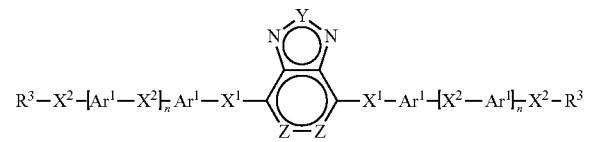

formula (P-1)

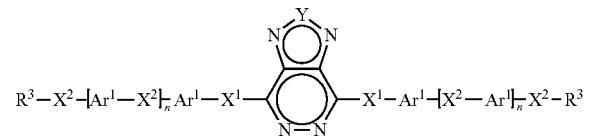

formula (P-2)

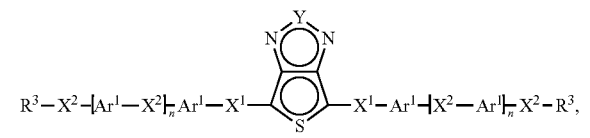

formula (P-3)

where the variable groups and indices occurring are as defined above. Preferably, the variable groups and indices are defined in accordance with their preferred embodiments.

In particular, it is preferred that the two side chains —$X^1$—$Ar^1$—$(X^2$—$Ar^2)_n$—$X^2$—$R^3$ of the compounds are different from each other.

The following compounds are examples of final products which can be prepared by using compounds of formula (I) as starting materials.

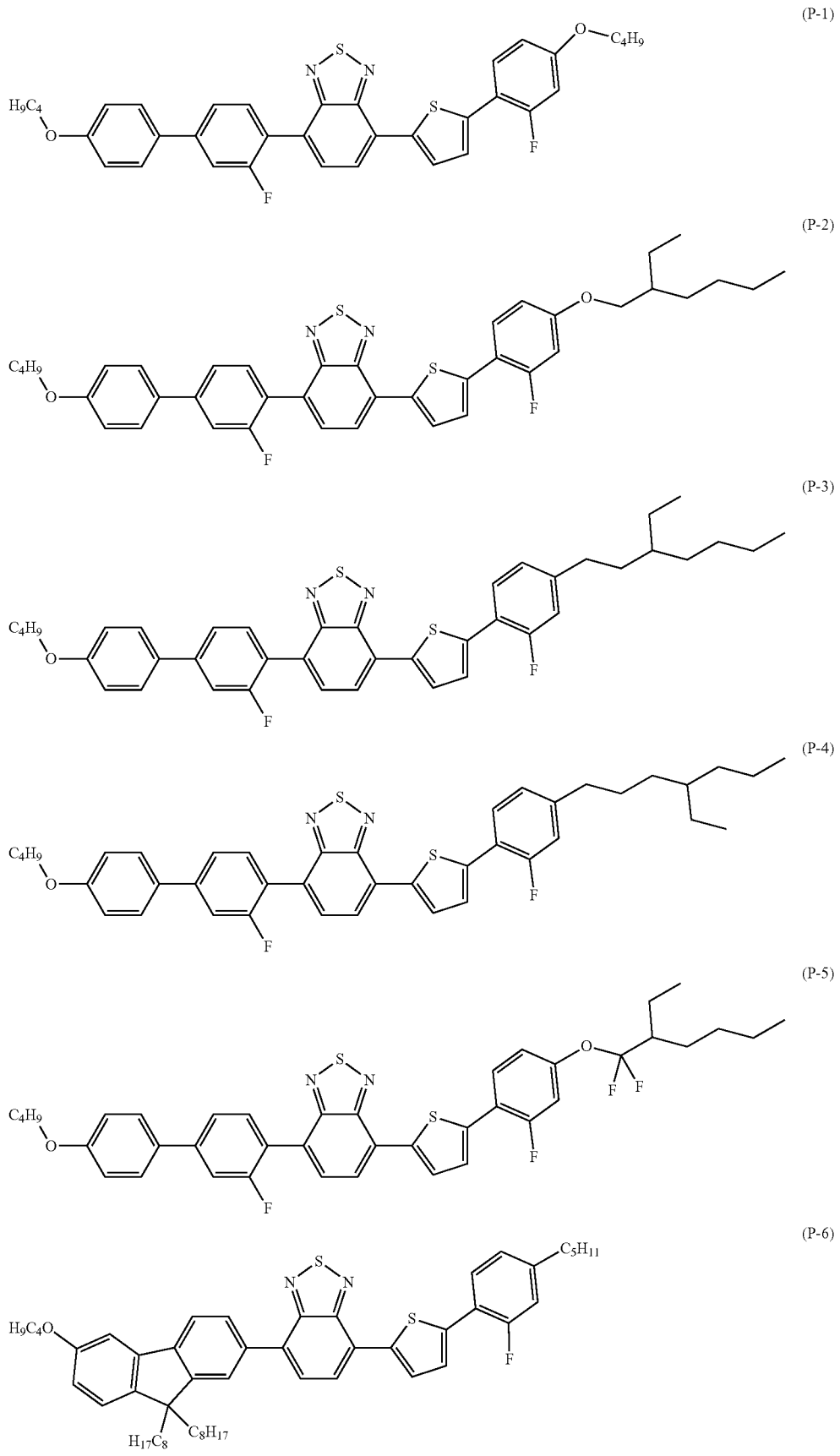

-continued

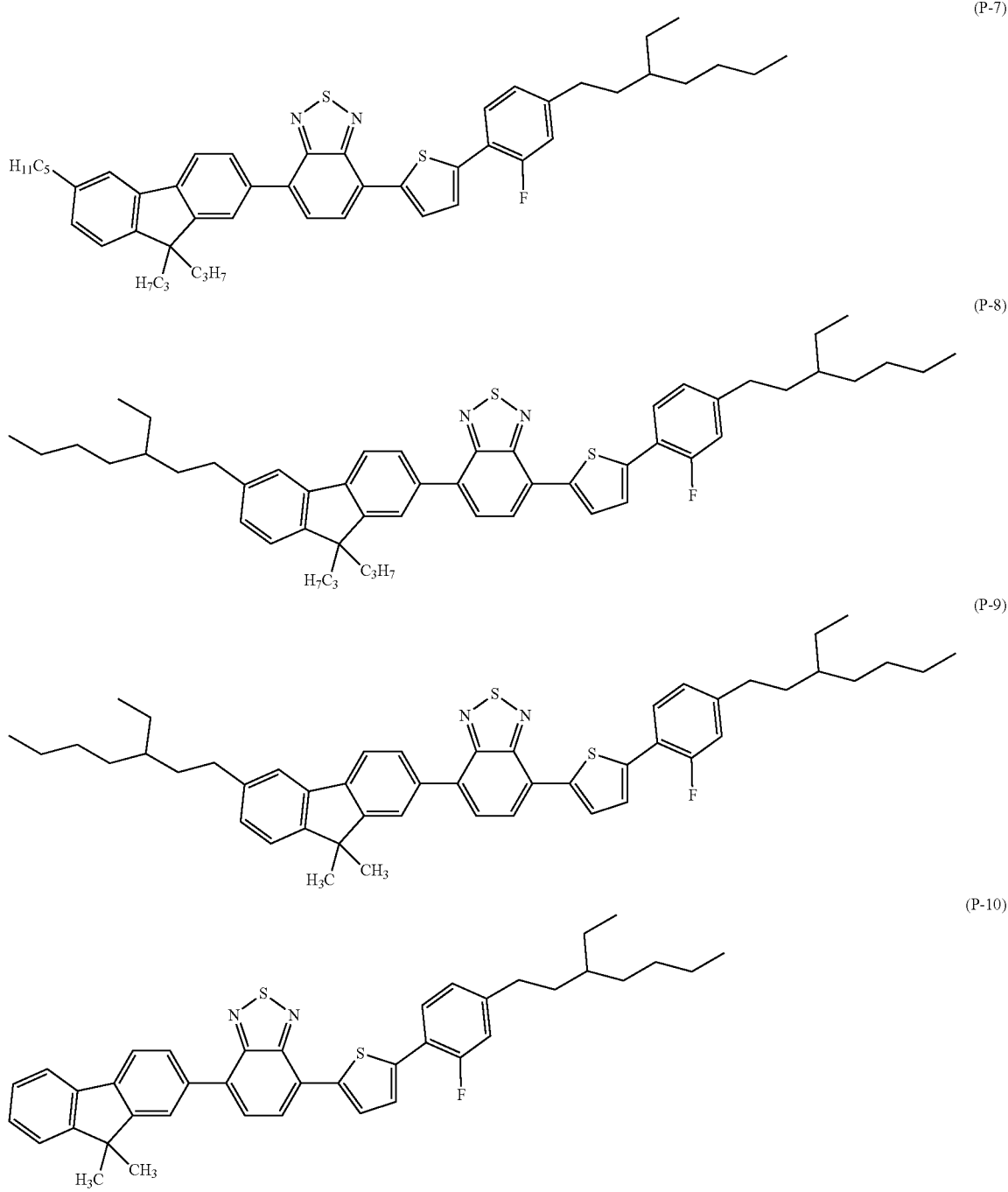

The compounds which are synthesized using compounds of formula (I) as starting materials are preferably used as dyes in guest host liquid crystal materials, which are in turn used as switchable layers in electrooptical devices, such as liquid crystal windows and liquid crystal displays. However, they may also be used as dye compounds for coloration of polymers, as pigments, and as organic semiconductors, for example for use in organic solar cells.

If the compounds are used in liquid crystal windows, they are preferably used as dye compounds which are mixed into a liquid crystalline material. As the liquid crystalline material, a large number of different compounds may be used. Preferred are mixtures comprising 5-25 different compounds, such as the ones disclosed in WO 2014/090367, WO 2015/090506, and WO 2015/154848.

In the liquid crystal windows, the liquid crystalline material comprising the dye compound is preferably present in the form of a thin layer, which is enclosed by two substrate plates, each having one electrode. When an electric field is applied over the layer of the liquid crystalline material comprising the dye compound, the molecules of the material align in response to the electrical field applied, which results in a change of the orientation of the dye compounds. Due to the dichroic property of the compounds of formula (P), the change in the orientation thus causes a change in the absorption of the compounds, which changes the transmissivity of the layer and thereby of the liquid crystal window.

Working Examples

Synthesis of Compounds According to the Invention

The starting compound SM can be obtained according to the procedures disclosed in F. Montanari et al., Boll. Fac. Chim. Ind. Bologna 1953, 11, 42-50; and S. Uchiyama et al., Chem. Eur. J. 2012, 18, 9552-9563.

Synthesis of 1:

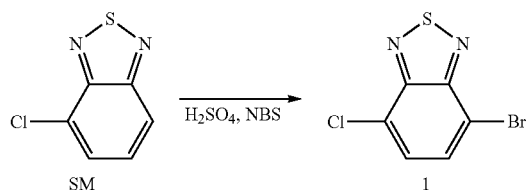 [SMILES: Clc1cccc2nsnc12 ; Clc1ccc(Br)c2nsnc12]

SM (9.2 g, 53 mmol) is dissolved at 0-18° C. in conc. $H_2SO_4$. Within 15 min, at 0° C., N-bromosuccinimide (9.6 g, 94 mmol) is added portionwise. The solution is stirred at 6° C. for 6 h, then warmed to room temperature and stirred for additional 18 h. The obtained orange colored solution is poured under stirring into ice water (500 mL), and the precipitated crude product is separated off by filtration through a glass frit and washed with water. Then, the separated precipitate is dissolved in warm $CH_2Cl_2$ (300 mL) and washed with water and 5% aqueous $NaHCO_3$ solution. The solution is dried over $Na_2SO_4$ and the solvent is removed in vacuo. The obtained solid (12.5 g; 97% HPLC-purity) is recrystallized from n-heptane/toluene 1:1. Yield 9.5 g of compound 1, 70%, HPLC-purity 98.4%, as beige-colored long needles. Analytical data: melting point 181.4° C.; $^1$H NMR (400.1 MHz, $CDCl_3$): δ=7.79 (d, J=7.66 Hz; 1H), 7.54 (d, J=7.66 Hz; 1H); MS (HPLC-APLI): m/z (%)=250 [M]$^+$ (100), 169 (27).

Synthesis of 2:

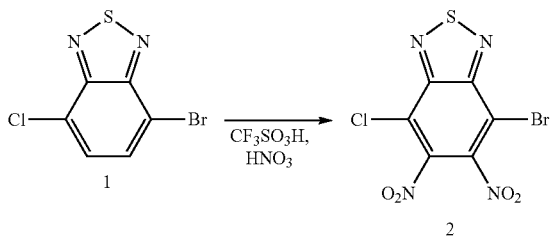 [SMILES: Clc1ccc(Br)c2nsnc12 ; O=[N+]([O-])c1c([N+](=O)[O-])c(Br)c2nsnc2c1Cl]

To trifluormethanesulfonic acid (20 mL, 228 mmol), fuming $HNO_3$ (10 mL, 24 mmol) is added at 0° C. To this mixture, cooled to 0° C., compound 1 (2.0 g, 7.9 mmol) is added. The mixture is then stirred at 60° C. for 18 h, then cooled to −10° C. At this temperature, carefully, 50 g of ice is added. After addition of more water (200 mL), the mixture is neutralized with 47% aqueous KOH (ca. 15 mL). The resulting precipitate is separated off by filtration through a glass frit, and washed with water. The obtained raw product (1.9 g) is recrystallized from acetonitrile (25 mL) at −20° C. Yield: 1.1 g, 38% of beige colored crystals of compound 2. Analytical data: melting point 187.5° C.; HR-MS ($C_6N_4O_4SClBr$): calc. 337.8512, found 337.8495; MS (HPLC-APLI): m/z (%)=339 [M]$^+$ (60), 265 (27), 235 (42), 166 (45), 154 (60), 131 (80).

Use of Compounds According to the Invention for the Synthesis of Asymmetrically Substituted Benzothiadiazole Compounds Synthesis of Compound 7:

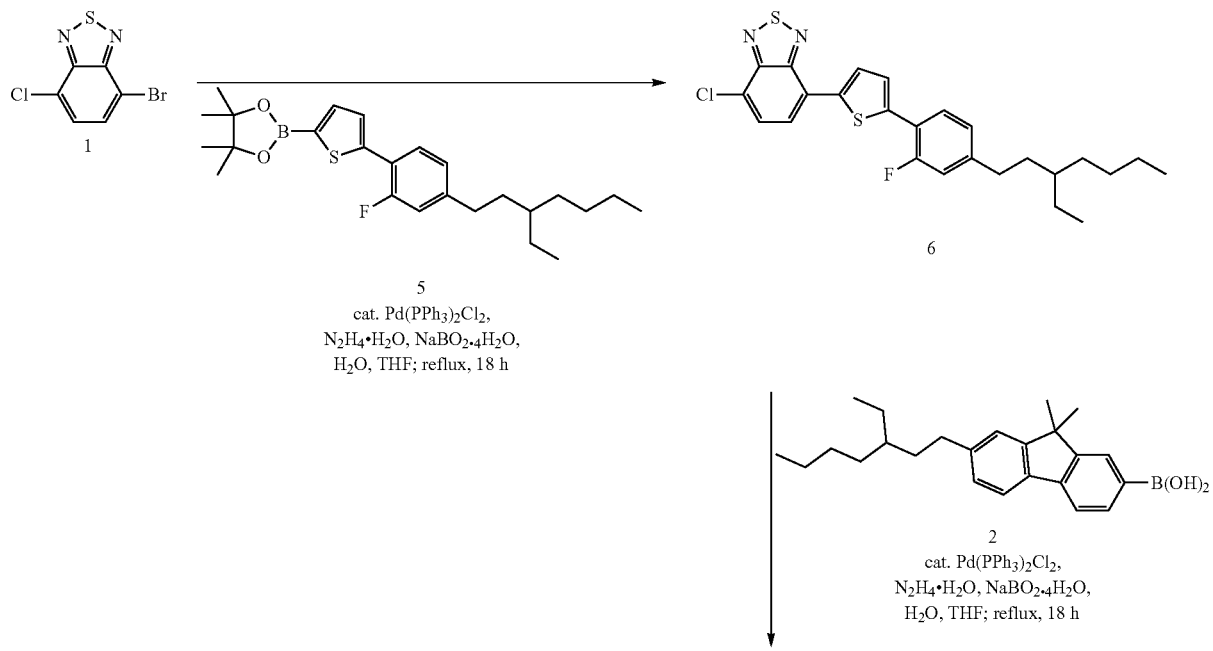

-continued

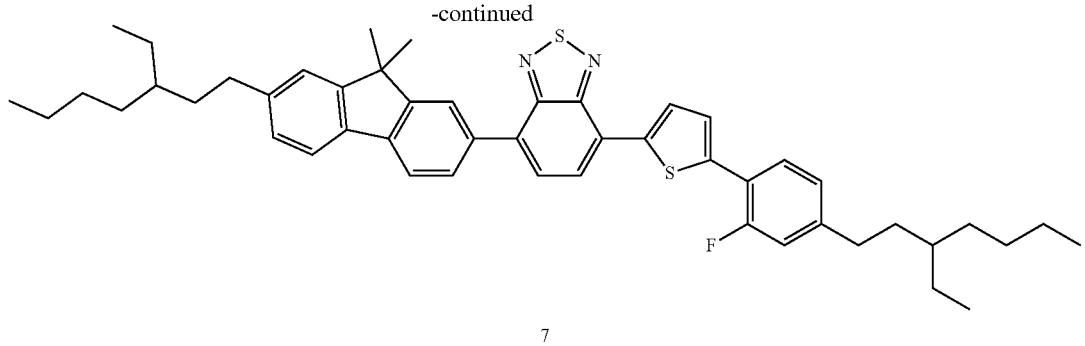

7

6: A mixture of 1 (10 g, 40 mmol), 5 (19.2 g, 41 mmol), NaBO$_2$.4H$_2$O (8.3 g, 60 mmol), bis(triphenylphosphino)palladium(II)-chloride (561 mg, 0.80 mmol), H$_2$O (25 mL), THF (150 mL), and hydrazine hydrate (49 μl) was refluxed for 18 h under nitrogen. The solution was worked up with H$_2$O/MTBE, the combined organic phases dried over Na$_2$SO$_4$ and evaporated to dryness. The crude product (19 g) was further purified by filtration over silicagel (n-heptane/1-chlorobutane 4:1), furnishing 17.2 g (91%) of 6 as red crystals.

7: A mixture of 6 (0.59 g, 1.25 mmol), 2 (0.45 g, 1.25 mmol), NaBO$_2$.4H$_2$O (0.26 g, 1.9 mmol), bis(tricyclohexylphosphin)palladium(II)-chloride (18.4 mg, 0.025 mmol), H$_2$O (0.6 mL), THF (2.5 mL), and hydrazine hydrate (2.5 μl) was refluxed for 18 h under nitrogen. Aqueous work-up (H$_2$O/MTBE), drying of the combined organic phases over Na$_2$SO$_4$ and evaporation of the solvent in vacuo furnished crude 7 (6.9 g, red oil), which was further purified by silicagel chromatography (n-Heptan/Toluol 1:1). Yield: 0.5 g (31%) of 7 as orange crystals.

Synthesis of Compound 13:

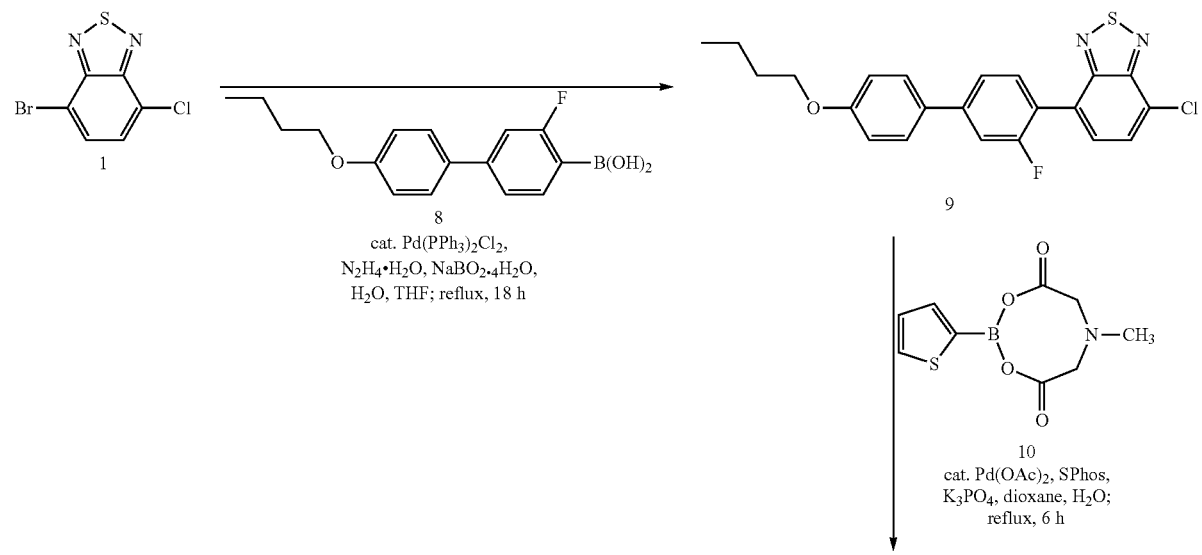

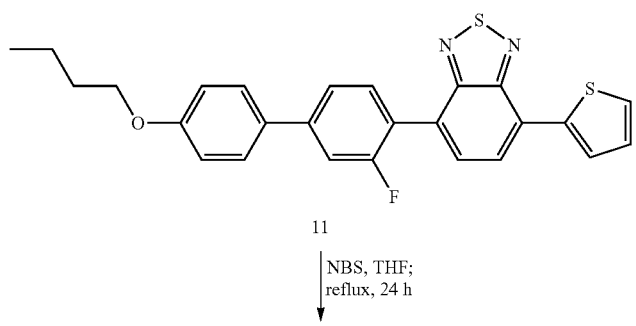

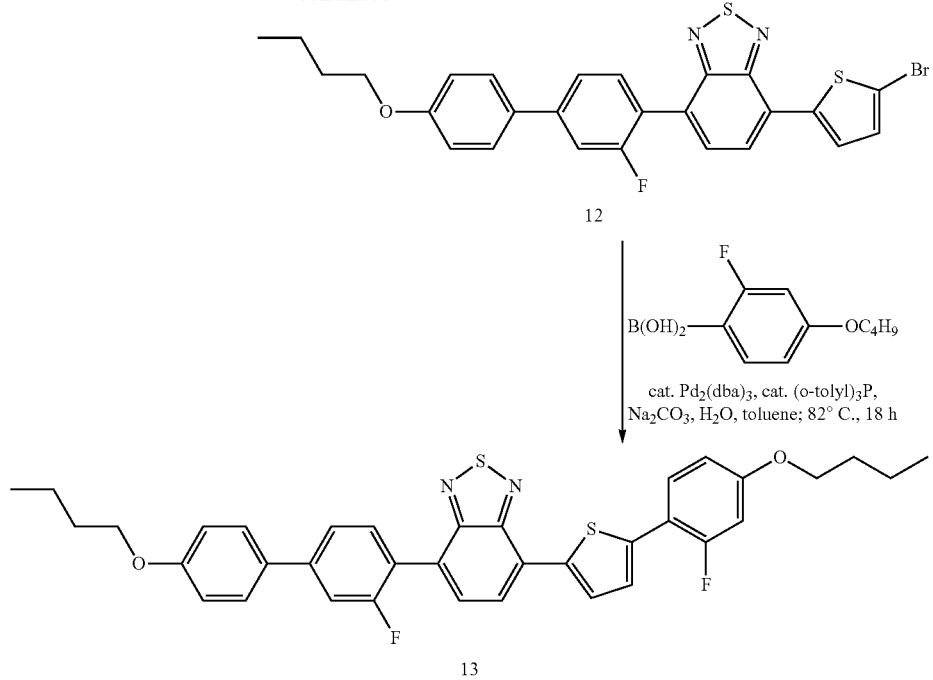

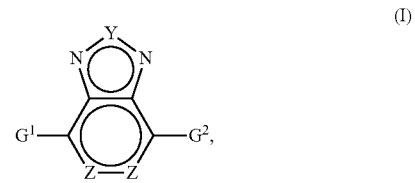

9: A mixture of 1 (3.3 g, 13.1 mmol), 8 (4.9 g, 14.0 mmol), NaBO$_2$·4H$_2$O (2.7 g, 20 mmol), bis(triphenylphosphin)palladium(II)-chloride (184 mg, 0.26 mmol), H$_2$O (10 mL), THF (50 mL), and hydrazine hydrate (16 μl) was refluxed for 18 h under nitrogen. Aqueous work-up (H$_2$O/MTBE), drying of the combined organic phases over Na$_2$SO$_4$ and evaporation of the solvent in vacuo furnished crude 9 (6.9 g), which was further purified by silicagel filtration (n-heptane/toluene 1:1). Yield: 6 g (94%) 9 as bright yellow crystals.

11: A mixture of 9 (5.0 g, 12.0 mmol), 10 (3.45 g, 14.0 mmol), K$_3$PO$_4$·3H$_2$O (19.1 g, 90 mmol), palladium(II)-acetate (135 mg, 1 mmol), SPhos ligand (494 mg, 1 mmol), H$_2$O (8 mL) and dioxan (42 mL) was refluxed for 6 h under nitrogen. Aqueous work-up (H$_2$O/MTBE), drying of the combined organic phases over Na$_2$SO$_4$ and evaporation of the solvent in vacuo furnished crude 11 (6.1 g), which was further purified by silicagel filtration (toluene). Yield: 5.5 g (99%) 11 as orange crystals.

12: A suspension of 11 (5.0 g, 9.3 mmol) and N-bromo succinimide (1.82 g, 10.2 mmol) in THF (50 mL) was refluxed for 24 h. The solution was allowed to cool to r.t., then 0.5 N aqueous NaOH (10 mL) was added. The precipitated product was filtered off, washed with cold THF and dried in vacuo. Yield: 4.6 g (91%) of 12 as orange crystals.

13: A mixture of 12 (1.5 g, 2.53 mmol), 13 (0.63 g, 2.9 mmol), Na$_2$CO$_3$ (1.1 g, 10 mmol), tris(dibenylideneacetone)palladium (23 mg, 0.025 mmol), tris(o-tolyl)phosphine (31 mg, 0.1 mmol), H$_2$O (8 mL) and toluene (2.5 mL) was heated to 82° C. for 18 h under nitrogen. Aqueous work-up (H$_2$O/toluene), drying of the combined organic phases over Na$_2$SO$_4$ and evaporation of the solvent in vacuo furnished crude 13, which was further purified by crystallization from dichloromethane. Yield: 1.0 g (62%) of 13 as orange crystals.

The above syntheses prove the potential of the inventive intermediate compounds of formula (I) for the efficient synthesis of asymmetric benzothiadiazole derivatives.

The invention claimed is:
1. A method of synthesizing a compound of formula (I),

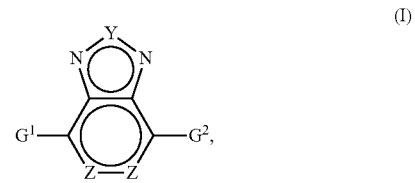

where the following applies to the variable groups occurring:

$G^1$, $G^2$ are selected from reactive groups, and $G^1$ and $G^2$ are selected differently;

Y is S;

Z either is selected, identically or differently, from $CR^1$ and N;

or the unit Z—Z is replaced by a divalent group selected from —S— and —Se—;

$R^1$ is selected, identically or differently on each occurrence, from H, D, F, Cl, CN, NO$_2$, N(R$^2$)$_2$, —(C═O)OR$^2$, —O(C═O)R$^2$, and alkyl, alkoxy or thioalkoxy groups having 1 to 20 C atoms, where the alkyl, alkoxy and thioalkoxy groups may be substituted with one or more radicals R$^2$, and where one or more CH$_2$ groups in the alkyl, alkoxy and thioalkoxy groups may be replaced by —R$^2$C═CR$^2$—, -C≡C, C═O, C═S, —C(═O)O—, —OC(═O)—, —Si(R$^2$)$_2$—, —NR$^2$—, —O— or —S—;

$R^2$ is selected, identically or differently on each occurrence, from H, D, F, Cl, CN, NO$_2$, NH$_2$, NAr$_2$, and alkyl, alkoxy or thioalkoxy groups having 1 to 20 C atoms, where one or more CH$_2$ groups in the alkyl, alkoxy and thioalkoxy groups may be replaced by —HC═CH—, -C≡C-, C═O, C═S, —C(═O)O—, —OC(=O)—, —NH—, —O— or —S—, and where the alkyl, alkoxy and thioalkoxy groups may be substituted with one or more radicals selected from F, Cl and CN; and Ar is selected, identically or differently, from aryl and heteroaryl groups having 5 to 30 aromatic ring atoms, which may be substituted by one or more radicals $R^2$ which do not comprise a group Ar wherein a compound of the formula (I-Int)

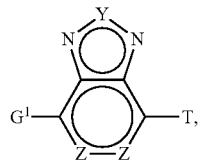

formula (I-Int)

where T is selected from H, D, and —OH, and the other variable groups occurring are as defined above for formula I is used as the starting material.

2. Synthesis A method according to claim 1, wherein either
   a) T is H or D, and the group T is replaced by a halogen by action of an electrophilic halogenation agent, or
   b) T is OH and the group T is transformed into a fluorosulfonate group or an alkylsulfonate group in which the alkyl group is optionally substituted by one or more F groups, by action of the respective fluorosulfonyl chloride or anhydride, or by action of the respective alkylsulfonyl chloride, fluoride or anhydride, respectively.

3. A method according to claim 1, characterized in that $G^1$ and $G^2$ are selected from reactive groups which are capable of acting as leaving groups.

4. A method according to claim 1, characterized in that one of $G^1$ and $G^2$ is a stronger leaving group than the other one of $G^1$ and $G^2$.

5. A method according to claim 1, characterized in that $G^1$ and $G^2$ are selected from halogen atoms, fluorosulfonate groups, alkylsulfonate groups in which the alkyl group is optionally substituted by one or more F groups, and carbonic acid ester groups.

6. A method according to claim 1, characterized in that $G^1$ and $G^2$ are selected from Cl, Br, I, and alkylsulfonate groups in which the alkyl group is substituted by one or more F groups.

7. A method according to claim 1, characterized in that one of the following applies: a) $G^1$ is Cl, and $G^2$ is selected from Br and I; or b) $G^1$ is Br, and $G^2$ is selected from I, Cl and alkylsulfonate groups in which the alkyl group is substituted by one or more F groups; or c) $G^1$ is I; and $G^2$ is selected from Cl, Br and alkylsulfonate groups in which the alkyl group is substituted by one or more F groups; or d) $G^1$ is selected from alkylsulfonate groups in which the alkyl group is substituted by one or more F groups; and $G^2$ is selected from I and Br.

8. A method according to claim 1, wherein the compound of formula (I) characterized in that it conforms to any of formulae (I-1), (I-2) and (I-3)

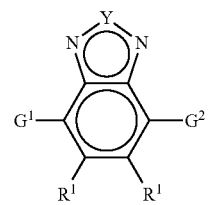

formula (I-1)

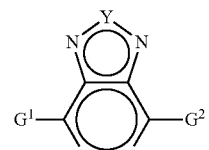

formula (I-2)

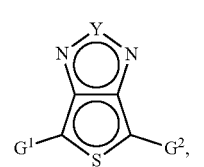

formula (I-3)

where the variable groups are defined as in claim 1.

9. A method according to claim 8, wherein the compound of formula (I) conforms to formula (I-1), where the groups $R^1$ are selected identically.

10. A method according to claim 1, wherein the compound of formula (I) has a unit of formula (I-core)

formula (I-core)

including any substituents of the groups Z, which belongs to the point group $C_{2v}$.

11. A method according to claim 1, wherein $R^1$ is selected, identically or differently on each occurrence, from H, F, CN, $NO_2$ and $NH_2$.

12. A method according to claim 1, wherein $R^1$ is selected, identically on each occurrence, from H, F, CN, $NO_2$ and $NH_2$.

13. A method comprising using a compound of formula (I) as a starting material,

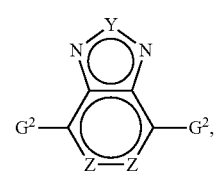

(I)

where the following applies to the variable groups occurring:

$G^1$, $G^2$ are selected from reactive groups, and $G^1$ and $G^2$ are selected differently;

Y is S;

Z either is selected, identically or differently, from $CR^1$ and N;

or the unit Z—Z is replaced by a divalent group selected from —S— and —Se—;

R$^1$ is selected, identically or differently on each occurrence, from H, D, F, Cl, CN, NO$_2$, N(R$^2$)$_2$, —(C=O)OR$^2$, —O(C=O)R$^2$, and alkyl, alkoxy or thioalkoxy groups having 1 to 20 C atoms, where the alkyl, alkoxy and thioalkoxy groups may be substituted with one or more radicals R$^2$, and where one or more CH$_2$ groups in the alkyl, alkoxy and thioalkoxy groups may be replaced by —R$^2$C=CR$^2$—, -C≡C-, C=O, C=S, —C(=O)O—, —OC(=O)—, —Si(R$^2$)$_2$—, —NR$^2$—, —O— or —S—;

R$^2$ is selected, identically or differently on each occurrence, from H, D, F, Cl, CN, NO$_2$, NH$_2$, NAr$_2$, and alkyl, alkoxy or thioalkoxy groups having 1 to 20 C atoms, where one or more CH$_2$ groups in the alkyl, alkoxy and thioalkoxy groups may be replaced by —HC=CH—, -C≡C, C=O, C=S, —C(=O)O—, —OC(=O)—, —NH—, —O— or —S—, and where the alkyl, alkoxy and thioalkoxy groups may be substituted with one or more radicals selected from F, Cl and CN; and Ar is selected, identically or differently, from aryl and heteroaryl groups having 5 to 30 aromatic ring atoms, which may be substituted by one or more radicals R$^2$ which do not comprise a group Ar, to synthesize a compound according to a formula (P) having different side chains on the two sides of the central unit formula (P)

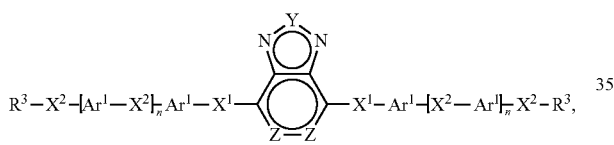

where

Y and Z are as defined above and the following applies to the further variable groups occurring:

Ar$^1$ is on each occurrence, identically or differently, an aryl or heteroaryl group having 5 to 30 aromatic ring atoms, which may be substituted by one or more radicals R$^4$;

X$^1$ is on each occurrence, identically or differently, a single bond, —CR$^5$=CR$^5$— or —C≡C—; or two, three, four or five groups combined with one another, selected from the groups —CR$^5$=CR$^5$— and —C≡C—;

X$^2$ is on each occurrence, identically or differently, a single bond, —CR$^5$=CR$^5$— or —C≡C—; or two, three, four or five groups combined with one another, selected from the groups —CR$^5$=CR$^5$— and —C≡C—;

R$^3$ is on each occurrence, identically or differently, H, D, F, CN, N(R$^6$)$_2$, or an alkyl, alkoxy or thioalkoxy group having 1 to 20 C atoms, or an alkenyl or alkinyl group having 2 to 20 C atoms, where the alkyl, alkoxy, thioalkoxy, alkenyl and alkinyl groups may be substituted by one or more radicals R$^6$, and where one or more CH$_2$ groups in the alkyl, alkoxy, thioalkoxy, alkenyl and alkinyl groups may be replaced by —R$^6$C=CR$^6$—, C=O, C=S, —C(=O)O—, —OC(=O)—, Si(R$^6$)$_2$, NR$^6$, —O— or —S—;

R$^4$, R$^5$ are on each occurrence, identically or differently, H, D, F, Cl, CN, or an alkyl, alkoxy or thioalkoxy group having 1 to 20 C atoms, or an alkenyl or alkinyl group having 2 to 20 C atoms, where the alkyl, alkoxy, thioalkoxy, alkenyl and alkinyl groups may be substituted by one or more radicals R$^6$, and where one or more CH$_2$ groups in the alkyl, alkoxy, thioalkoxy, alkenyl and alkinyl groups may be replaced by —R$^6$C=CR$^6$—, C≡C, C=O, C=S, —C(=O)O—, —OC(=O)—, Si(R$^6$)$_2$, NR$^6$, —O— or —S—;

R$^6$ is on each occurrence, identically or differently, H, D, F, Cl, CN, N(R$^7$)$_2$, an alkyl, alkoxy or thioalkoxy group having 1 to 20 C atoms, an alkenyl or alkynyl group having 2 to 20 C atoms, or an aryl or heteroaryl group having 5 to 30 aromatic ring atoms, where the aryl and heteroaryl group may in each case be substituted by one or more radicals R$^7$, where the alkyl, alkoxy, thioalkoxy, alkenyl and alkynyl groups may each be substituted by one or more radicals R$^7$, and where one or more CH$_2$ groups in the alkyl, alkoxy, thioalkoxy, alkenyl and alkynyl groups may be replaced by —R$^7$C=CR$^7$—, C≡C, C=O, C=S, —C(=O)O—, —O(C=O)—, Si(R$^7$)$_2$, NR$^7$, —O— or —S—;

R$^7$ is on each occurrence, identically or differently, H, F or an aliphatic organic radical having 1 to 20 C atoms, in which one or more H atoms may be replaced by F, or an aryl or heteroaryl group having 5 to 20 C atoms, in which one or more H atoms may be replaced by F;

n is, identically or differently on each occurrence, selected from 0, 1, 2, 3, 4, or 5.

14. A method according to claim 13, wherein in the compound of formula (P), the two side chains —X$^1$—Ar$^1$—(X$^2$—Ar$^1$)$_n$-X$^2$—R$^3$ are different from each other.

* * * * *